United States Patent
Tsutazawa et al.

(10) Patent No.: US 7,782,186 B2
(45) Date of Patent: Aug. 24, 2010

(54) ABSTRACT STATE MONITORING SYSTEM AND METHOD FOR THE SAME

(75) Inventors: Natsuko Tsutazawa, Tokyo (JP); Hirokazu Takatama, Tokyo (JP)

(73) Assignee: Nec Corporation, Tokyo (JP)

( * ) Notice: Subject to any disclaimer, the term of this patent is extended or adjusted under 35 U.S.C. 154(b) by 501 days.

(21) Appl. No.: 11/723,615

(22) Filed: Mar. 21, 2007

(65) Prior Publication Data
US 2007/0226162 A1    Sep. 27, 2007

(30) Foreign Application Priority Data
Mar. 22, 2006    (JP) .............................. 2006-079428

(51) Int. Cl.
*G08B 29/00* (2006.01)
*G08B 26/00* (2006.01)
*G06N 5/02* (2006.01)

(52) U.S. Cl. ...................... 340/506; 340/505; 709/204; 706/47

(58) Field of Classification Search ................. 340/506
See application file for complete search history.

(56) References Cited

U.S. PATENT DOCUMENTS

2004/0153506 A1 *  8/2004  Ito et al. ..................... 709/204

2005/0197995 A1 *  9/2005  Badt et al. ..................... 707/1

FOREIGN PATENT DOCUMENTS

| JP | 2002-91893 | 3/2002 |
| JP | 2004-29925 | 1/2004 |
| JP | 2004-246397 | 9/2004 |

OTHER PUBLICATIONS

"A Model for Presence and Instant Messaging," J. Rosenberg et al., Network Working Group, Feb. 2000.
"Resource Description Framework (RDF): Concepts and Abstract Syntax," Graham Klyne, Feb. 2004, pp. 1-13.
"RDF Vocabulary Description Language 1.0: RDF Schema," Dan Brickley, Feb. 2004, pp. 1-16.
"OWL Web Ontology Language," Deborah L. McGuinness, pp. 1-22, Feb. 2004.

* cited by examiner

*Primary Examiner*—Donnie L Crosland
(74) *Attorney, Agent, or Firm*—Young & Thompson

(57) ABSTRACT

To realize state estimation that corresponds with an actual situation by dynamically changing an abstract state calculation method. Upon receiving an abstract state monitoring request, an abstract state generation section 10 extracts a constituent element of an abstract state from the request, selects a rule for calculating an abstract state from the presence of the element, and generates a presence servicing client 20 that has a watcher for observing the element via a presence servicing section 40 and a presentity for issuing the presence of the abstract state to the presence service. Further, the rule for calculating an abstract state is changed in accordance with presence.

36 Claims, 15 Drawing Sheets

F I G. 10
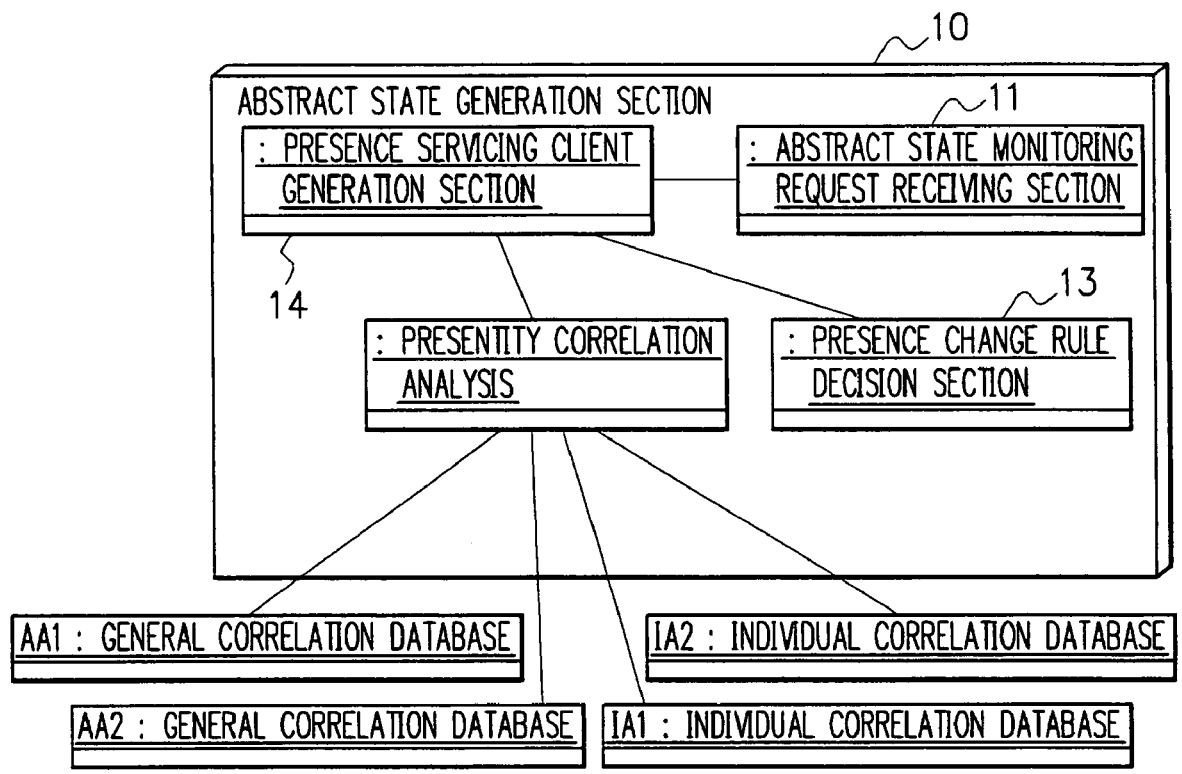

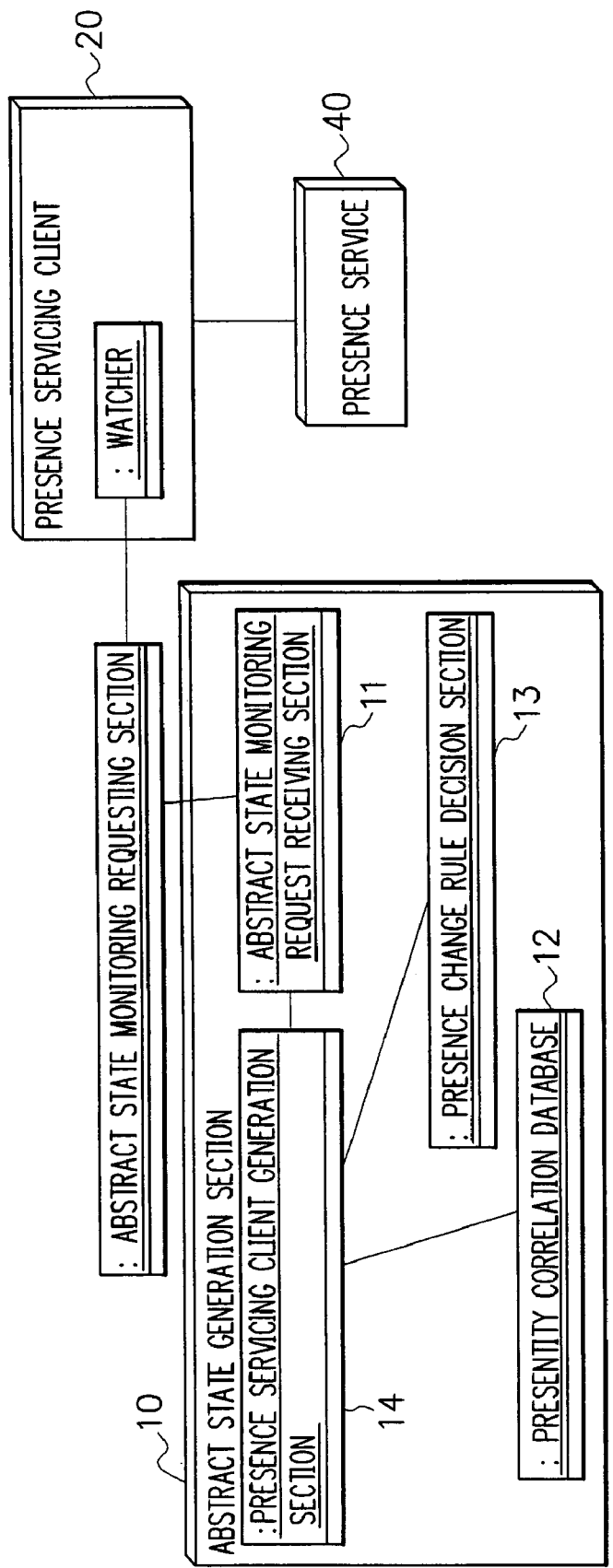
F I G. 14

ABSTRACT STATE MONITORING SYSTEM AND METHOD FOR THE SAME

BACKGROUND OF THE INVENTION

1. Field of the Invention

The present invention relates to a technique for monitoring an abstract state in a presence service.

2. Description of Related Art

There have been known presence systems for managing users' state. For example, patent document 1 (Japanese Patent Application Laid Open No. 2004-246397) describes a presence system that uses a buddy list (or a state-monitored person list).

A presence system is one of names of a presence service that generally represents a system for managing states of individual users, devices, services, concepts or the like, and the basic architecture is shown in Request For Comment (RFC) 2778.

A presence system includes presentities, watchers, and a presence servicing section.

A presentity stores the state (or presence information) of a person who provides state information. Specifically, a presentity is a terminal device that stores presence information of an entity that provides state information.

A watcher provides presence information stored by the presentity to a person who receives state information. Specifically, a watcher is a terminal device that receives presence information stored by the presentity.

The watcher receives presence information of a certain presentity specified by the watcher, not all presetities' presence information. A presentity specified by a watcher is called a buddy (a target of monitoring). The watcher creates a buddy list indicating buddies (or a state-monitored entity list) in order to obtain presence information for the buddies.

The presence servicing section delivers presence information about the buddies indicated in the buddy list to the watcher.

Patent document 2 (Japanese Patent Laid Open No. 2002-091893) describes a workflow system in which a plurality of terminal devices which are interconnected through a network updates one electronic file in turn.

Also, Semantic Web has been known as a technique for representing relationships among presentities. Basic technologies for realizing the Semantic Web include RDF, RDF schema, and/or OWL. The RDF is representation of meta data that can be processed by machines; the RDF schema provides means for defining vocabulary (class and property); and the OWL is a technique that enables more detailed definition of vocabulary and also enables inference for allowing association and merging of a plurality of schemata.

Patent document 3 (Japanese Patent Laid Open No. 2004-029925) discloses a techniques including means for a suspicious person monitoring device to receive suspicious person monitoring request information from a user; first storage means for storing monitoring timer information that corresponds to the suspicious person monitoring request; means for extracting monitoring timer information corresponding to the suspicious person monitoring request from the first storage means and setting a monitoring timer that is based on monitoring timer information; second storage means for storing empty home information corresponding to the suspicious person monitoring request information; and means for, when time-out of the monitoring timer is detected, generating suspicious person presence information based on the suspicious person monitoring request information and empty home information corresponding to the suspicious person monitoring request information extracted from the second storage means, and sending the suspicious person presence information to the user.

Other references relating to the above conventional techniques are: IETF RFC2778 (http://www.ietf.org/rfc/rfc2778.txt), RDF Resource Description Framework (RDF) Concepts and Abstract Syntax (http://www.w3.org/TR/rdf-concepts/), RDF Vocabulary Description Language (http://www.w3.org/TR/rdf-schema/), OWL Web Ontology Language Overview (http://www.w3.org/TR/owl-features/).

However, the above-mentioned conventional techniques have problems as follows.

To obtain an abstract state, it is necessary to estimate the abstract state. To estimate the state, it is required to obtain, calculate, and combine states of elements that constitute the abstract state.

To be specific, following two operations are required:

(1) Elements that constitute an abstract state are appropriately selected. For example, a user may select a resident A of a house as an element that makes up the state of the house. When the house resident A goes out, the user selects a fixed phone in the house.

(2) A method for calculating an abstract state is appropriately selected. For example, in order to derive the state of the house, the user selects the calculation method 1 from state calculation methods 1 and 2 in accordance with the resident A's state.

A problem is that automation of these processes by combining conventional techniques results in an estimated abstract state that does not correspond with an actual situation. Ror example, assume that "resident A" and "a monitoring system" are extracted as elements constituting the abstract state of the house and a calculation method is: "When position information for resident A represents the house, the state of the house is assumed to be 'safe', otherwise 'unsafe'". Assume further that the monitoring system is activated when the resident A leaves the house. In this case, a combination of conventional techniques would determine the state of the house to be "unsafe" when position information of "resident A" indicates somewhere other than the house. However, since the monitoring system is on, the state of the house must be "safe". Thus the estimated abstract state does not correspond with the actual situation.

Also, even if suspicious person presence information (one of abstract states) disclosed in patent document 3 is generated based on rules, suspicious person presence information that does not correspond with an actual situation will be calculated because it is not possible to dynamically select a method for calculating suspicious person presence information.

That is, a method for calculating suspicious person presence information cannot be selected in response to update of empty home information. In addition, because selection of a method for calculating suspicious person presence information is not automatically made in response to addition of a new door or other equipment or elimination thereof, calculation might become impossible. For instance, since the method for calculating suspicious person presence information disclosed in patent document 3 is fixedly selected, only binary calculation, e.g., opening and closing of a door, is possible and suspicious person presence information cannot be calculated from equipment that possesses three or more values. Specifically, it is impossible to select a method for calculating suspicious person presence information in response to update of the state (e.g., opening and closing) of floor equipment, such as a door.

SUMMARY OF THE INVENTION

An objective of the invention is to realize state estimation that corresponds with an actual situation by dynamically changing an abstract state calculation method.

The present embodiments provide an abstract state monitoring system that changes a rule for calculating an abstract state in accordance with presence.

Also, the present embodiments provide an abstract state monitoring system, wherein an abstract state generation section includes an abstract state monitoring requesting section, a presence servicing client generation section, and a presence change rule decision section; the abstract state generation section receives an abstract state monitoring request with the abstract state monitoring requesting section and extracts a constituent element of an abstract state from the monitoring request; the presence servicing client generation section selects a rule for calculating an abstract state from the presence of the element and generates a presence servicing client that has a watcher for observing the element via a presence service and a presentity for issuing the presence of an abstract state to the presence service; a user monitors the abstract state via the presence service; and the abstract state generation section obtains presence via the presence service with the presence change rule decision section and changes the rule for calculating an abstract state in accordance with the presence.

Also, the present embodiments provide an abstract state monitoring method that changes a rule for calculating an abstract state in accordance with presence.

Also, the present embodiments provide an abstract state monitoring method, wherein an abstract state generation section includes an abstract state monitoring requesting section, a presence servicing client generation section, and a presence change rule decision section; the abstract state generation section receives an abstract state monitoring request with the abstract state monitoring requesting section and extracts a constituent element of an abstract state from the monitoring request; the presence servicing client generation section selects a rule for calculating an abstract state from the presence of the element and generates a presence servicing client that has a watcher for observing the element via a presence service and a presentity for issuing the presence of an abstract state to the presence service; a user monitors the abstract state via the presence service; and the abstract state generation section obtains presence via the presence service with the presence change rule decision section and changes the rule for calculating an abstract state in accordance with the presence.

According to the present embodiments, it is possible to realize state estimation that corresponds with an actual situation by dynamically changing an abstract state calculation method.

BRIEF DESCRIPTION OF THE DRAWINGS

The objects and features of the present invention will become more apparent from the consideration of the following detailed description taken in conjunction with the accompanying drawings, in which:

FIG. 10 shows the general configuration of an abstract state monitoring system according to an embodiment 6-2;

FIG. 14 shows the general configuration of an abstract state monitoring system according to a tenth embodiment;

DESCRIPTION OF THE PREFERRED EMBODIMENTS

Now, the configuration of a first embodiment will be described with reference to drawings.

Figure 1:
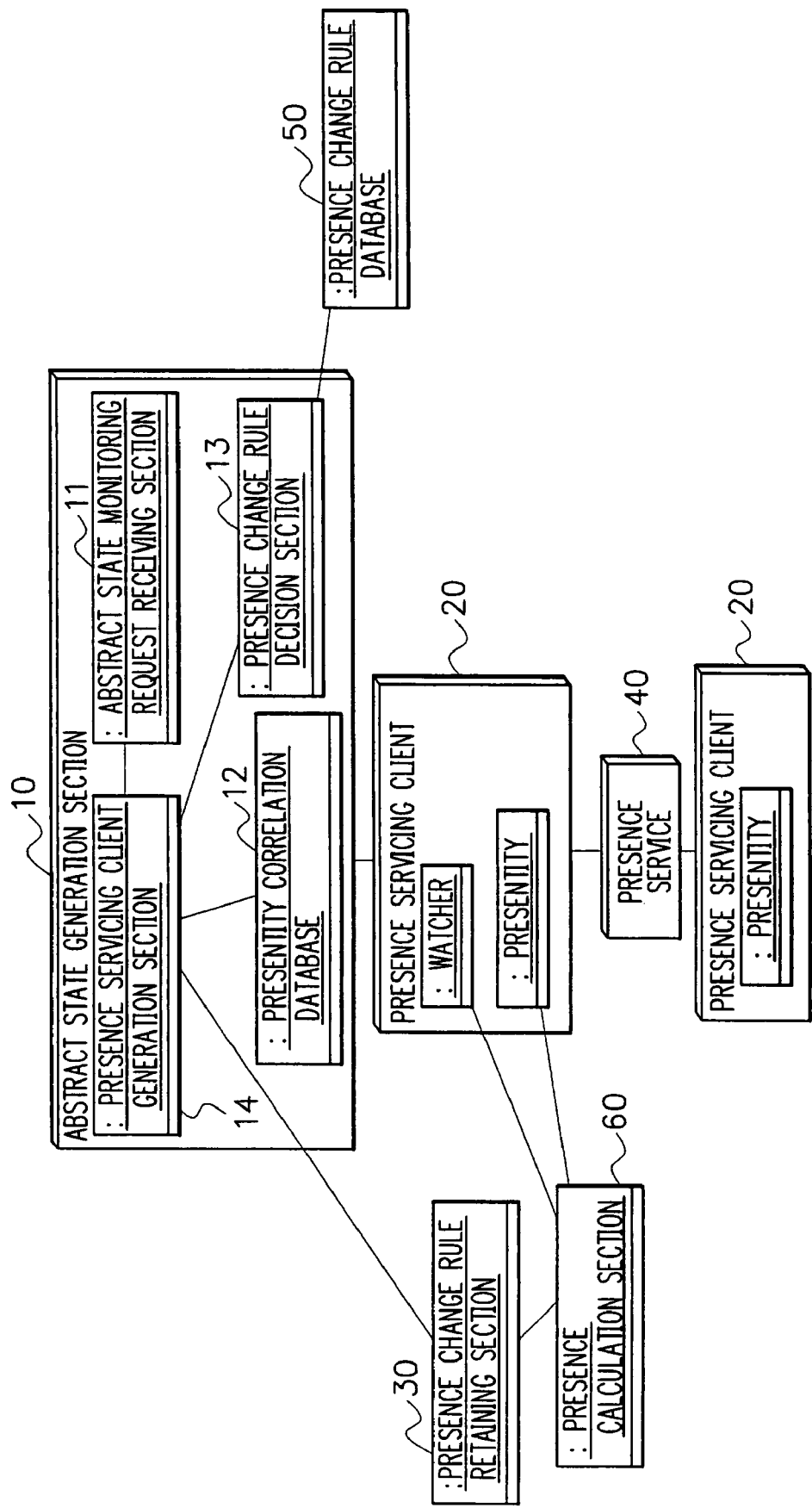
FIG. 1 shows the general configuration of an abstract state monitoring system according to a first embodiment.

Referring to FIG. 1, an abstract state monitoring system includes an abstract state generation section 10, a presence servicing client 20, a presence change rule retaining section 30, a presence servicing section 40, a presence change rule database 50, and a presence calculation section 60.

The client 20 includes a presentity that issues presence information representing an abstract state to the section 40 and a watcher that observes the presence (or state) of abstract state constituent elements (i.e., one or more presentities) via the section 40.

The section 30 holds rules established by a user (or a "PRINCIPAL" as called in RFC 2778) and, based on the rules, presence information about presentities is derived. An example of presence changing rules is: user's own presence information is set to a designated value when presence information about another presentity becomes a certain value. Rule's formats can be set arbitrarily.

For example, a presence change rule can be described in "IF . . . , THEN . . . " format. In this case, the left part (i.e., IF . . . ) is a conditional expression for the presence value of another presentity that is watched by the watcher. On the other hand, the right part (i.e., THEN . . . ) specifies a value to which the value of presence information of a presentity itself as the target of change should be set.

Concrete contents of a presence changing rule may be: "If the presence of presentity A is X, the presence of presentity B is set to Y", as illustrated in FIG. 1.

The presence calculation section 60 is capable of calculating the value of presence information of a presentity of the client 20 from the value of presence information of the presentity obtained from the watcher of the client 20, based on a rule obtained from the section 30, and requesting the presentity to change a presence value.

The section 10 includes an abstract state monitoring request receiving section 11, a presentity correlation database 12, a presence change rule decision section 13, and a presence client generation section 14.

The section 11 receives abstract state monitoring requests. An abstract state monitoring request contains the identifier or type of a monitoring target.

The database 12 contains data on correlations among presentities and retrieves constituent elements of an abstract state from an abstract state monitoring request based on those correlations. Data on correlations among presentities can be described in Resource Description Framework (RDF) format, for example.

The section 13 selects a presence change rule to be applied to change of presence.

The section 14 establishes a buddy list (or a state monitoring target list) for the watcher based on a list of abstract state constituent elements which is obtained from the database 12, registers a presence change rule obtained from the section 13 to the section 30, and also generates a presence servicing client 20 that has the watcher and a presentity that issues an abstract state to the section 40.

Now, processing operations will be described in detail with reference to drawings.

This embodiment is characterized in that it provides automatic selection of constituent elements of an abstract state and selection of a presence change rule for calculating the abstract state from the state of the elements in order to automatically generate an abstract state requested by a user.

Operations will be described using the module configuration diagram shown FIG. 1 and inter-module message diagrams shown in FIGS. 2 and 3.

In FIG. 1, presence change rules are registered in the presence change rule database. It is assumed that a husband presentity and a wife presentity have issued their latest presence to the section 40.

"User A's home", "user A's home: wife", and "user A's home: husband" represent presentity identifiers.

Figure 2:
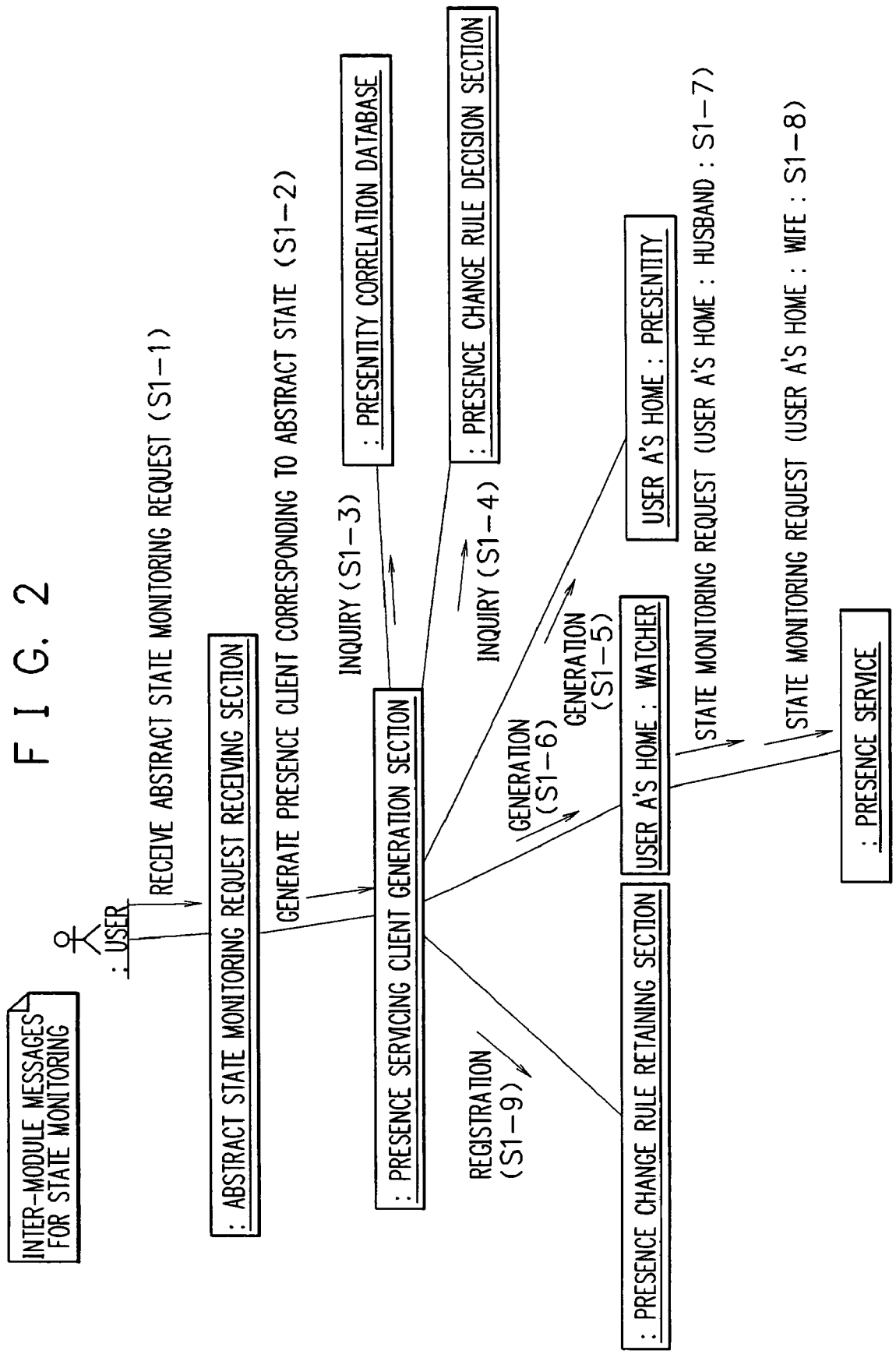
FIG. 2 shows an inter-module message diagram of the first embodiment.

In FIG. 2, the section 11 first receives a state monitoring request for "user A's home" from the user as an abstract state monitoring request (S1-1).

Then, the section 11 passes the abstract state monitoring request to the section 14 (S1-2).

The section 14 passes the abstract state monitoring request to the database 12 (S1-3).

Based on the abstract state monitoring request, the database 12 searches for elements that constitute the state of "user A's home". As the result of the search, the database 12 returns "user A's home: wife" and "user A's home: husband" to the section 14 (S1-4).

The section 14 inquires of the section 13 a presence change rule for generating the state of "user A's home" from the state of "user A's home: husband" and that of "user A's home: wife" (S1-5).

The section 13 inquires of the database 50 a presence change rule for "user A's home", and the database 50 returns a registered presence change rule: "IF either of the husband or wife is at home, THEN the presence of the house is set to 'at home'", to the section 14 (S1-6).

The section 14 generates a presence servicing client 20 that consists of a presentity which issues presence information for "user A's home" and a watcher which observes the presence of "user A's home: wife" and "user A's home: husband" (S1-7).

The section 14 registers the presence change rule to the section 30 (S1-8).

The section 40 receives a state monitoring request for "user A's home: husband" and one for "user A's home: wife" from the watcher observing the presence of "user A's home: husband" and "user A's home: wife" (S1-9).

Figure 3:
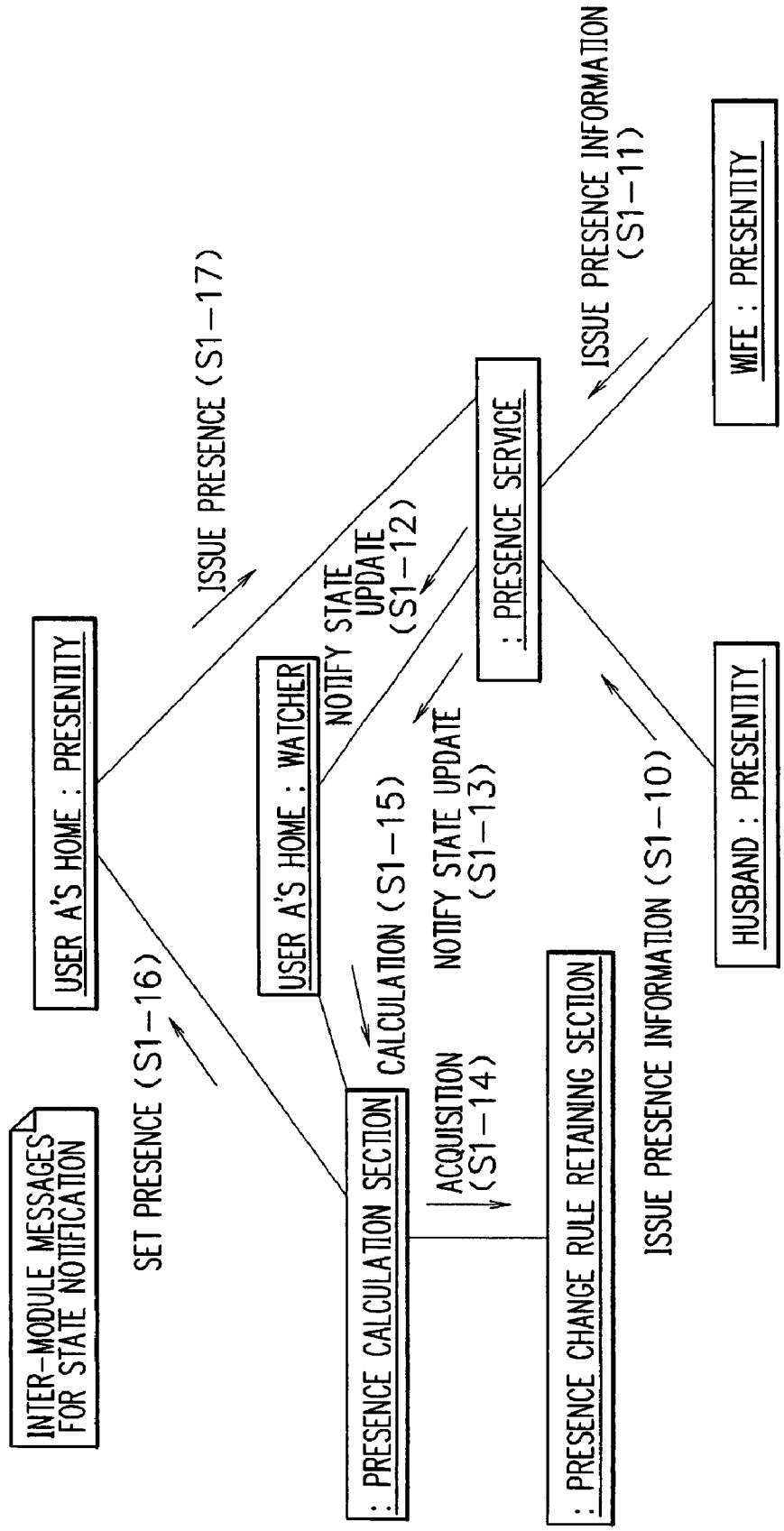
FIG. 3 shows an inter-module message diagram of the first embodiment.

In FIG. 3, the section 40 notifies the watcher of "user A's home" (which issued the state monitoring requests) of the presence of "user A's home: husband" presentity and "user A's home: wife" presentity (S1-10 and 1-11).

The section 60 receives the presence of "user A's home: husband" and that of "user A's home: wife" as a request for presence calculation from the "user A's home" watcher (S1-12 and 1-13).

The section 60 obtains the presence change rule for "user A's home" from the section 30 (S1-14).

The section 60 calculates the presence of the "user A's home" presentity from the presence of "user A's home: husband", "user A's home: wife", and the presence change rule for "user A's home" (S1-15).

The section 60 sets the result of the calculation as the presence of the "user A's home" presentity (S1-16).

The "user A's home" presentity issues the presentity's own presence information to the section 40 (S1-17).

The user can then learn the state of "user A's home" via the section 40.

According to the embodiment described above, when a user wants to monitor an abstract state, namely, a state that is not associated with a sensor, e.g., mood or future situations, the user can monitor the abstract state just by specifying the abstract state, while a conventional technique has to define from scratch a function for analyzing elements constituting an abstract state and/or calculating and combining abstract states from the state of the elements.

A second embodiment will be described next.

This embodiment is characterized in that a presence change rule is automatically selected in accordance with state. In the present example, a presence change rule is automatically selected in accordance with the state of elements constituting an abstract state.

Figure 4:
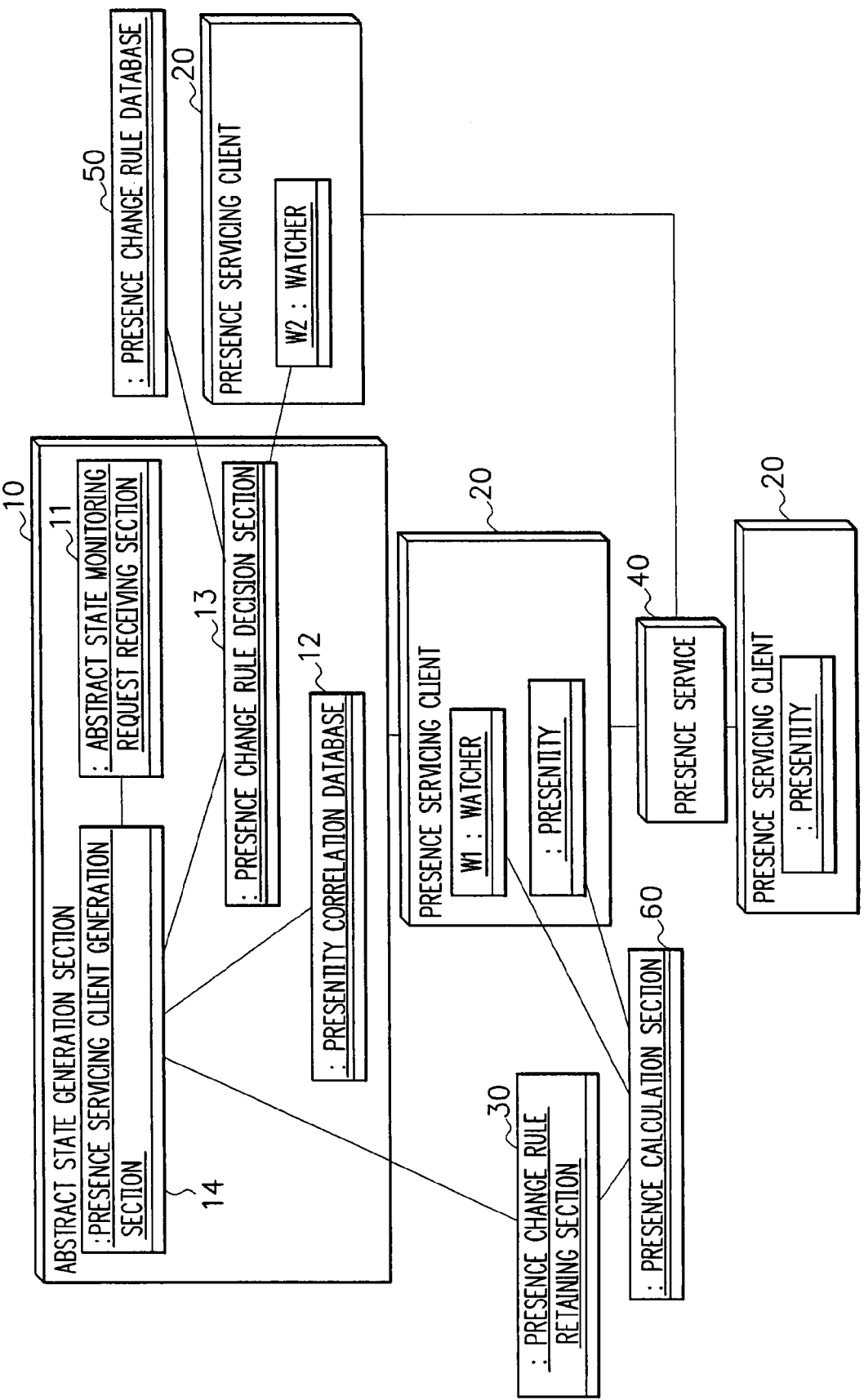
FIG. 4 shows the general configuration of an abstract state monitoring system according to a second embodiment.

The section 13 can access a presence servicing client 20 that comprises a watcher W2. In FIG. 4, the watcher W2 observes the presence of "user A's home: wife", "user A's home: husband", and "user A's home: answering machine" by way of the section 40. Assuming that the database 12 returns "user A's home: wife", "user A's home: husband" and "user A's home: answering machine" to the section 14 at step S1-4 as the result of searching for constituent elements of the state of "user A's home", operations described below may be performed at step S1-6. Also, the watcher W2 may be one and the same with the watcher W1.

Assume that presence change rule A is "IF the position of either the husband or wife is the user A's home, THEN the presence of "user A's home" is set to 'at home'" and presence rule B is "IF the answering mode of the answering machine in user A's home is set to ON, THEN the presence of "user A's home" is set to 'empty'". Assume further that the section 13 is configured to select presence change rule A when the position information presence of either "user A's home: wife" or "user A's home: husband" represents "user A's home", otherwise select presence change rule B.

The section 13 obtains the presence of "user A's home: wife", "user A's home: husband" and "user A's home: answering machine" from the watcher (S2-1).

If position information presence of both "user A's home: wife" and "user A's home: husband" is not "user A's home", the section 13 returns presence change rule B to the section 14 (S2-2).

A modified second embodiment (embodiment 2-2) will be described next.

This embodiment analyzes an abstract state monitoring request issued in a natural language to provide an abstract state monitoring request that can be understood by the system.

Figure 5:
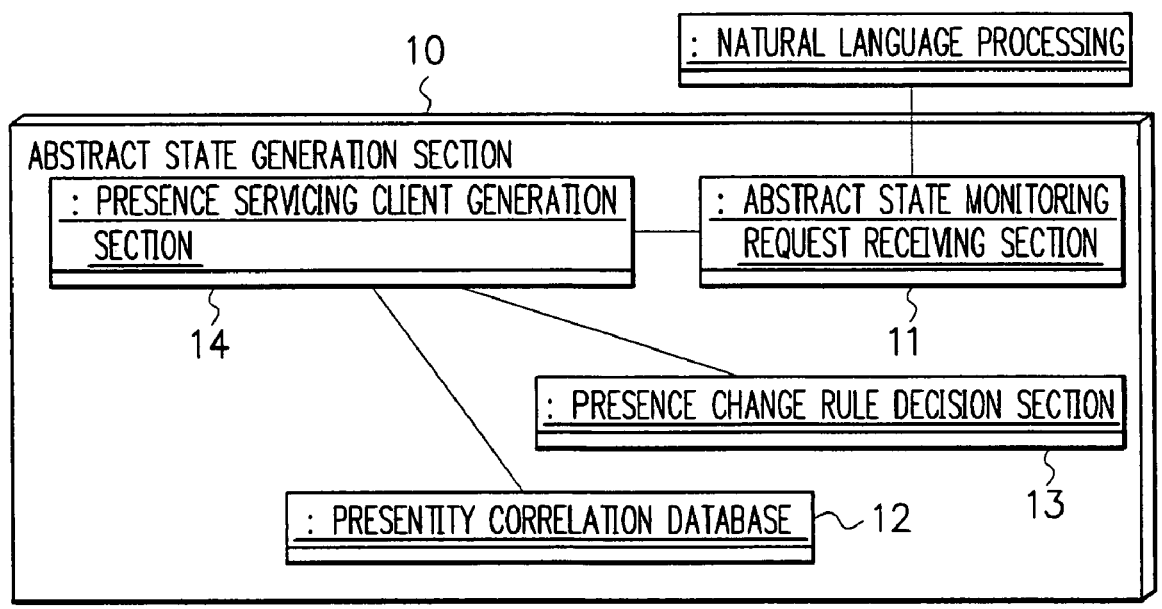
FIG. 5 shows the general configuration of an abstract state monitoring system according to an embodiment 2-2.

Referring to FIG. 5, a natural language processing section can access the section 11. Although not shown, a natural language processing section also has an external input means. The natural language processing section receives natural language as input, resolves its ambiguity and outputs it.

The user inputs such a request as "I wants to monitor the state of user A's home" to the natural language processing section (S2-2-1).

The natural language processing section analyzes the input "I want to monitor the state of user A's home" and sends "user A's home" to the section 11 (S2-2-2). Following operations are similar to step S1-1 and subsequent steps.

A third embodiment will be described next.

This embodiment is characterized in that a presence change rule is selected by input means provided outside the section 10. A presence change rule is selected by a user, for example.

Figure 6:
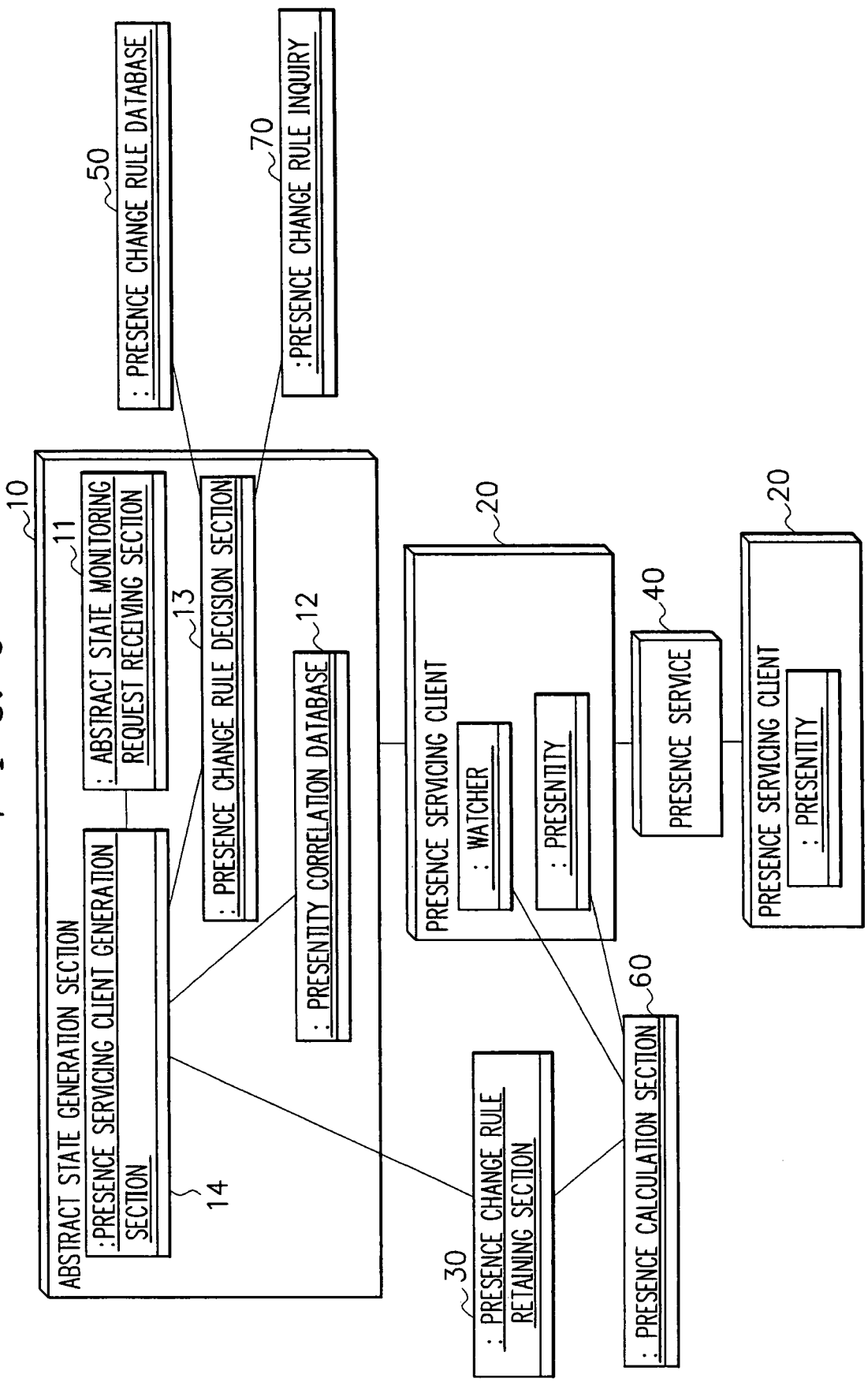
FIG. 6 shows the general configuration of an abstract state monitoring system according to a third embodiment.

In FIG. 6, the section 13 can access a presence change rule inquiring section 70. The section 70 has an interface for a user to select a rule to be applied. Assuming that the database 12 returns "user A's home: answering machine" to the section 14 at step S1-4 in addition to "user A's home: wife" and "user A's home: husband" as the result of searching for constituent elements of the state of "user A's home", operations described below may be performed at step S1-6.

The section 13 utilizes the section 70 to have an external input select a rule that will be actually applied from among a plurality of rules (e.g., presence change rules A and B) that can be applied to the presence of "user A's home" (S3-1).

The user selects presence change rule A (3-2).

The section 13 returns presence change rule A to the section 14 (S3-3).

A fourth embodiment will be described next.

This embodiment changes a presence change rule in response to change in the state of a presentity. In the present example, when the state of an abstract state constituent element (i.e., a presentity) becomes available, a presence change rule is changed.

The section 13 may also select a presence change rule at a time other than when a presence servicing client 20 is generated.

Operations following the step S2-2 described above will be described.

The section 13 obtains the presence of "user A's home: wife" and "user A's home: husband" from the watcher, and, since position information can be now obtained from the presence of "user A's home: wife" and "user A's home: husband", the section 13 selects presence change rule A and notifies the section 14 of the selected rule (S4-1).

The section 14 registers presence change rule A to the section 30 and deregisters presence change rule B (S4-2).

A fifth embodiment will be described next.

This embodiment selects abstract state constituent elements based on an abstract state monitoring request from a user, general correlation data and individual correlation data.

Assume that following pieces of information are registered in the database 12 as general correlations.

The following data indicates relation of <a resident> <being at> <home>.

A1: <a resident> <is at> <home>

Further, the following data are registered as individual information:

C1: <user A's home: husband> <is at> <user A's home>

C2: <user A's home: wife> <is at> <user A's home>

"User A's home" is concretization of the "house".

"User A's home: husband" and "user A's home: wife" are concretization of "residents".

Operations described below may be performed at step S1-4 described above.

The database 12 searches for <residents> from "user A's home" and A1. It is also determined that "user A's home: husband"<is at home> from A1 and C1 and that "user A's home: wife"<is at home> from A1 and C2. Consequently, the database 12 retrieves identifiers "user A's home: husband" and "user A's home: wife" as constituent elements of the state of "user A's home" and returns them to the section 14.

A sixth embodiment will be described next.

Figure 7:
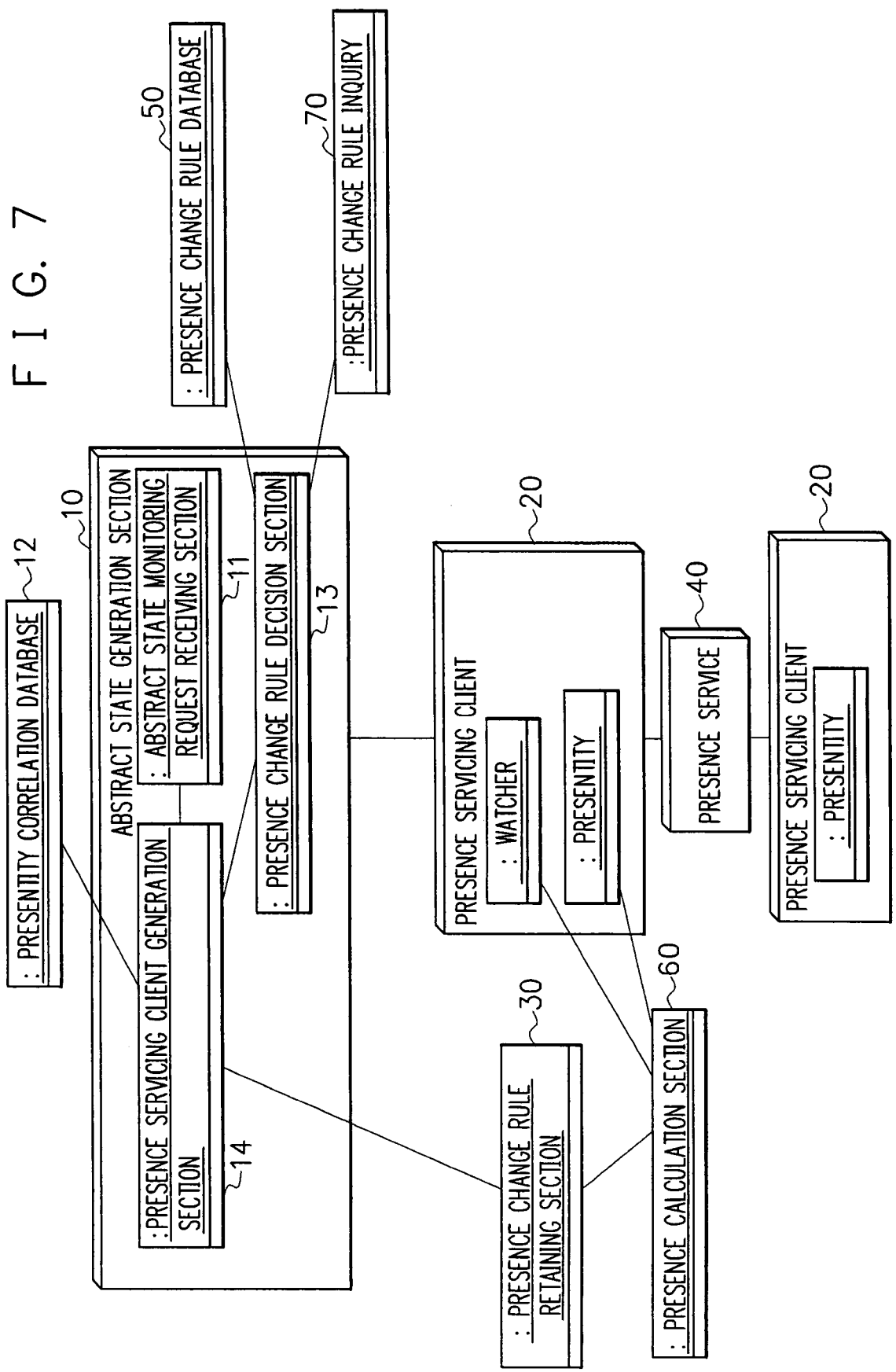
FIG. 7 shows the general configuration of an abstract state monitoring system according to a sixth embodiment.

Referring to FIG. 7, the database 12 may also be positioned outside the section 10.

A modified sixth embodiment 6-2 will be now described.

Figure 8:
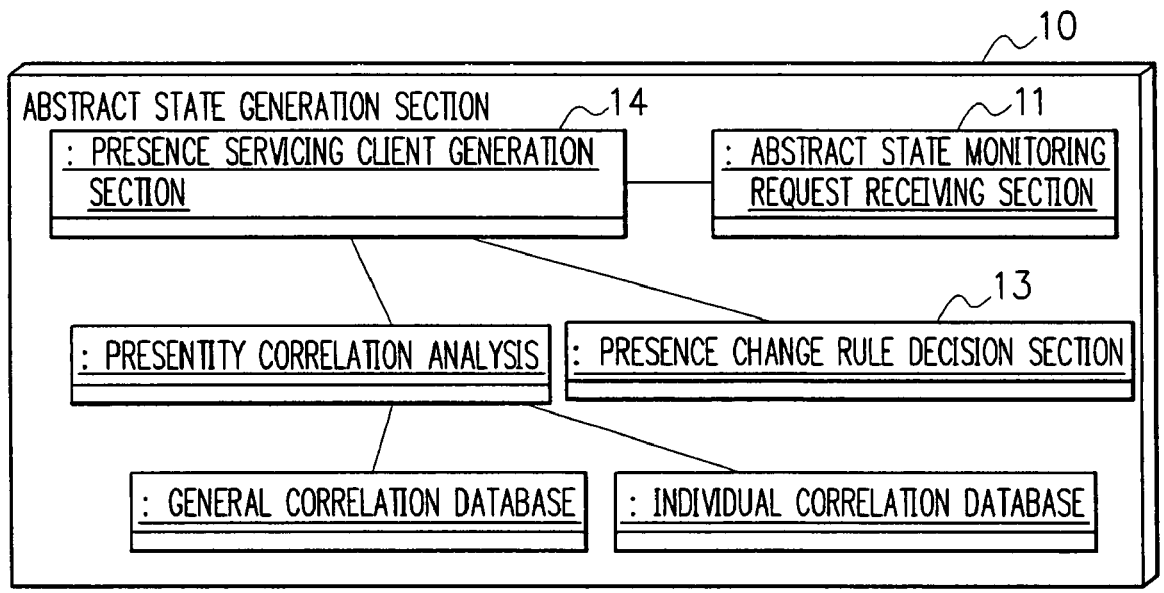
FIG. 8 shows the general configuration of an abstract state monitoring system according to an embodiment 6-2.

In FIG. 8, a general correlation database that stores general correlation data and an individual correlation database that stores individual correlation data can be accessed by a presentity correlation analyzing section. The presentity correlation analyzing section may also select an abstract state constituent element from general correlation data and individual correlation data of the fifth embodiment.

Figure 9:
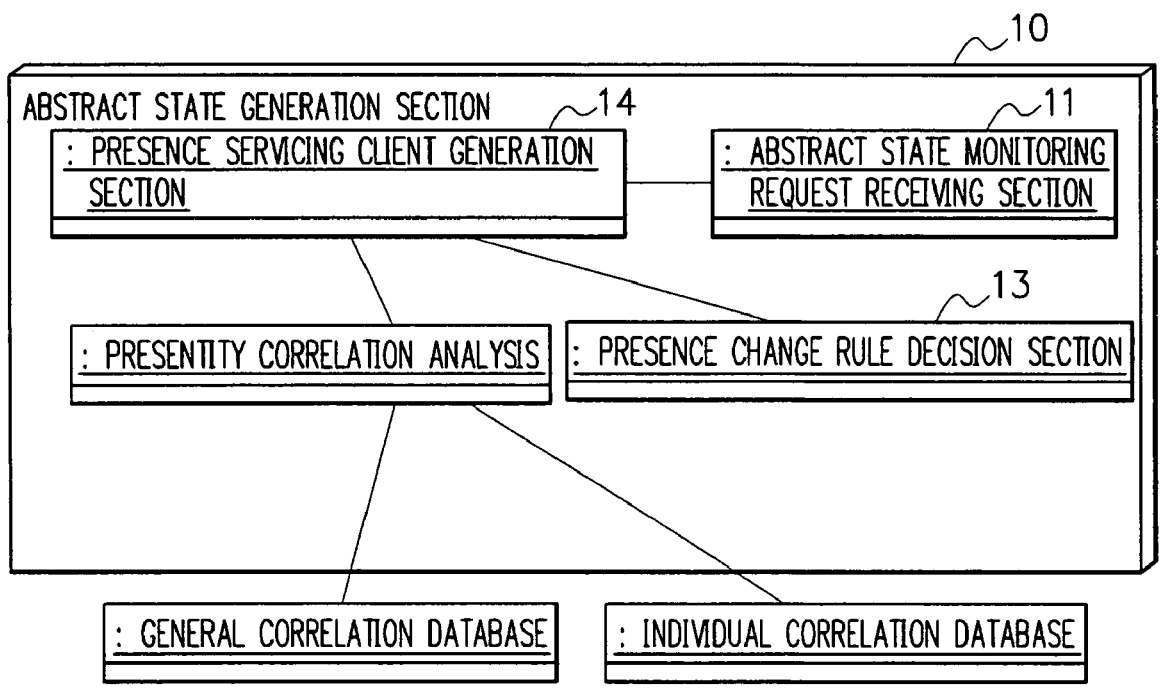
FIG. 9 shows the general configuration of an abstract state monitoring system according to an embodiment 6-2.

Referring to FIG. 9, the general correlation database and the individual correlation database of the embodiment 6-2 may also be positioned outside the section 10.

Referring to FIG. 10, a plurality of the general correlation databases and the individual correlation databases of embodiment 6-2 may be provided with respect to the presentity correlation analyzing section. Also, when data obtained from a general correlation database and data from an individual correlation database conflict with each other, the presentity correlation analyzing section may resolve the conflict based on their priorities (e.g., priorities are assigned to the databases or pieces of data).

Figure 11:
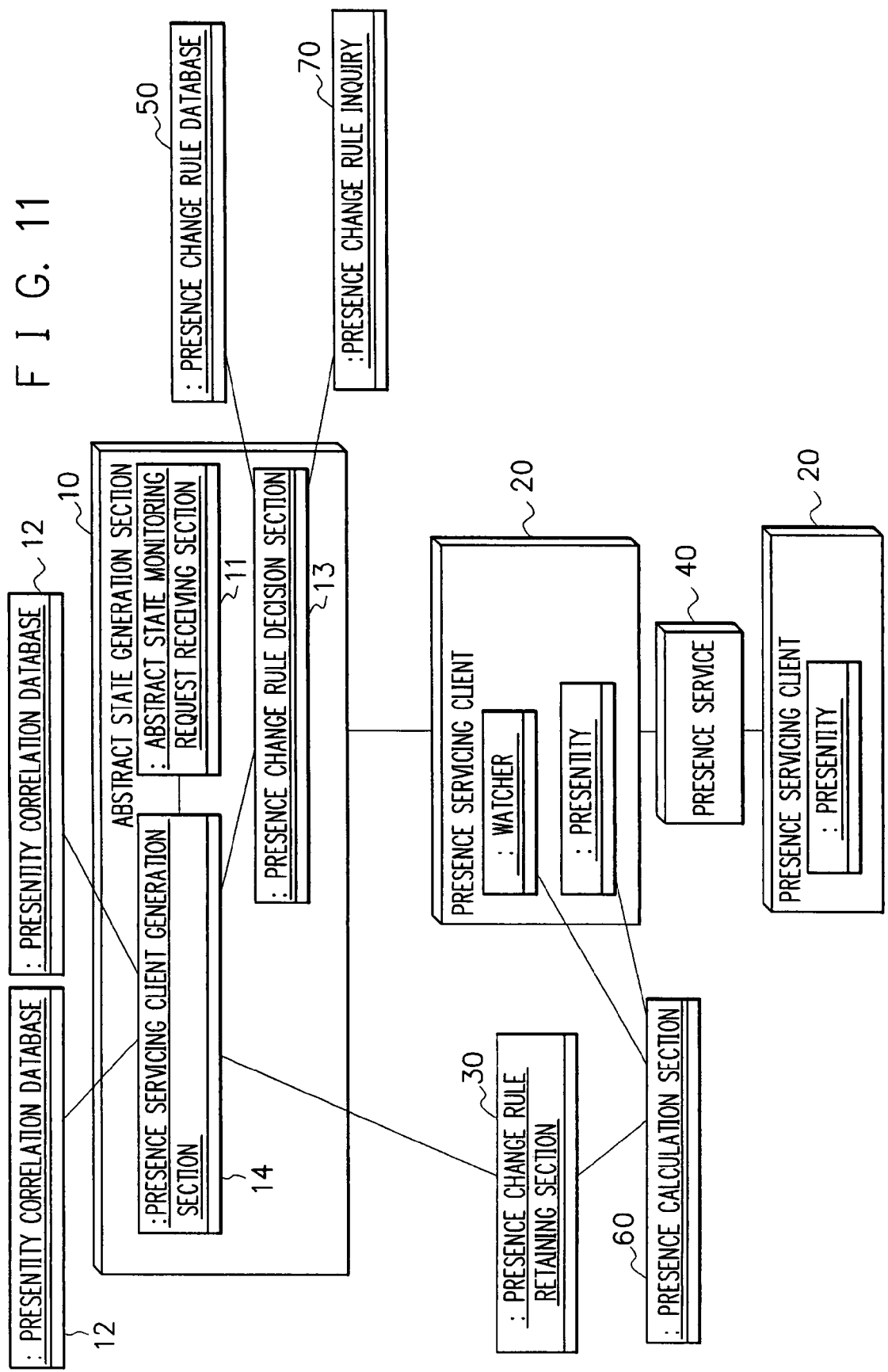
FIG. 11 shows the general configuration of an abstract state monitoring system according to a seventh embodiment.

A seventh embodiment will be now described. In FIG. 11, in addition to the sixth embodiment, the section 14 may inquire of a plurality of presentity correlation databases 12 about constituent elements of an abstract state. Also, priorities may be assigned to the databases 12 and/or abstract state constituent elements for resolving conflict among returned values from two or more databases 12.

An eighth embodiment will be now described. This embodiment utilizes rules for automatically selecting a presence change rule (or presence change rule selection rules). The second and fourth embodiments described above may also be realized by utilizing the rule selection rules.

Figure 12:
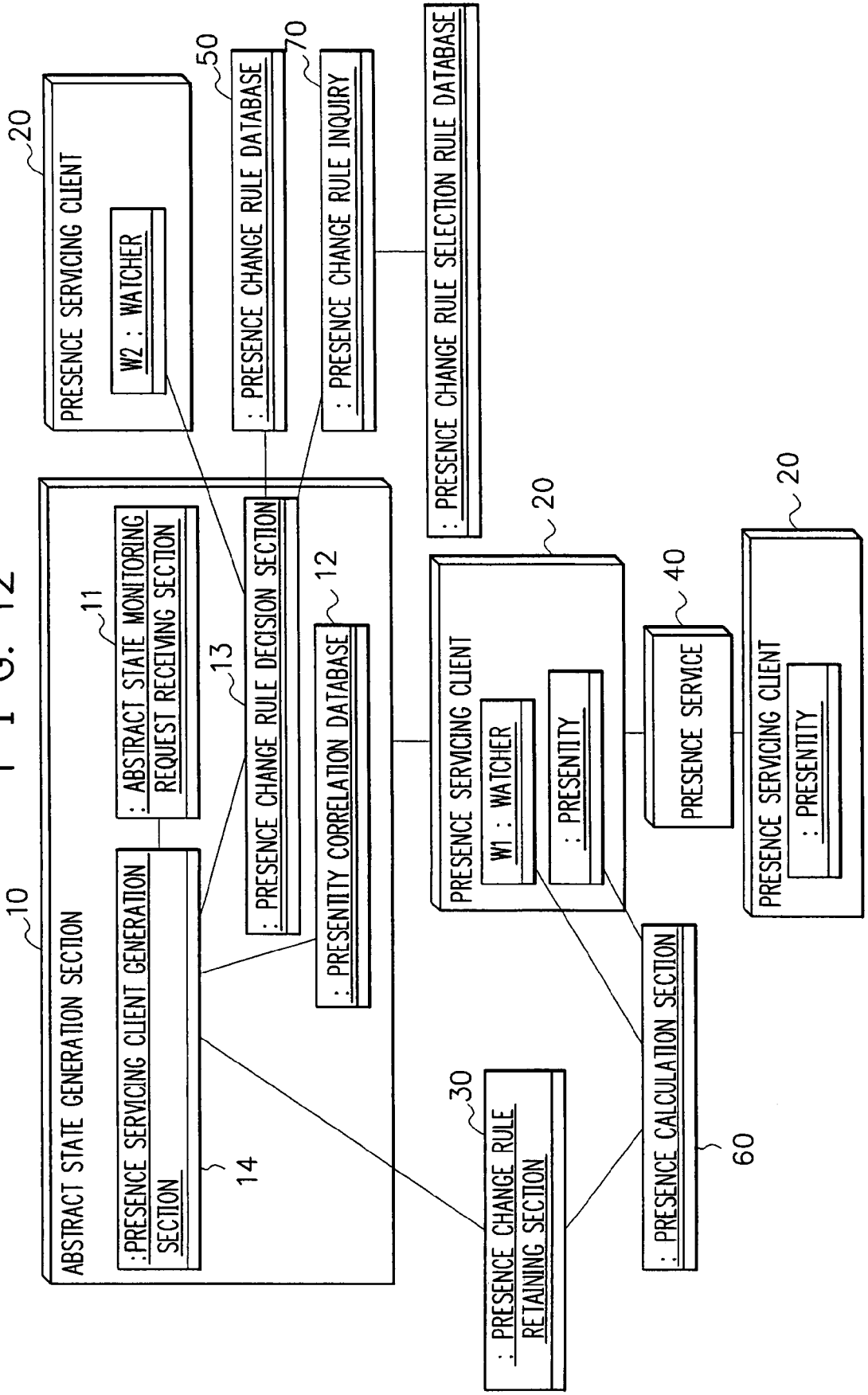
FIG. 12 shows the general configuration of an abstract state monitoring system according to an eighth embodiment.

In FIG. 12, in addition to the configuration of the third embodiment described above, the section 70 can access a database of presence change rule selection rules. A presence change rule selection rule can be described in "IF, ... THEN ..." format. In this case, the left part (IF ...) is a conditional expression for the presence value of another presentity watched by the watcher. Meanwhile, the right part (THEN ...) designates a presence change rule that should be selected.

Following operations may be performed in place of step S3-2 described above.

The section 70 inputs the presence of "user A's home: husband", "user A's home: wife" and "answering machine"

obtained from a presence client to the database of presence change rule selection rules (S8-1).

From those inputs, the database of presence change rule selection rules derives a presence change rule selection rule: "IF position information for both the husband and the wife is unknown, THEN presence change rule B applies" (S8-2).

The section 13 returns presence change rule B to the section 14 (S8-3).

A ninth embodiment will be now described. This embodiment checks whether an abstract state corresponding to an abstract state monitoring request already exists before generating an abstract state and, if such an abstract state exists, it reuses the state. Specifically, prior to generating a presence servicing client 20, a check is made to see whether there is a presentity for issuing presence that represents an abstract state, and if such a presentity exists, the process of newly generating a presence servicing client 20 is omitted.

Figure 13:
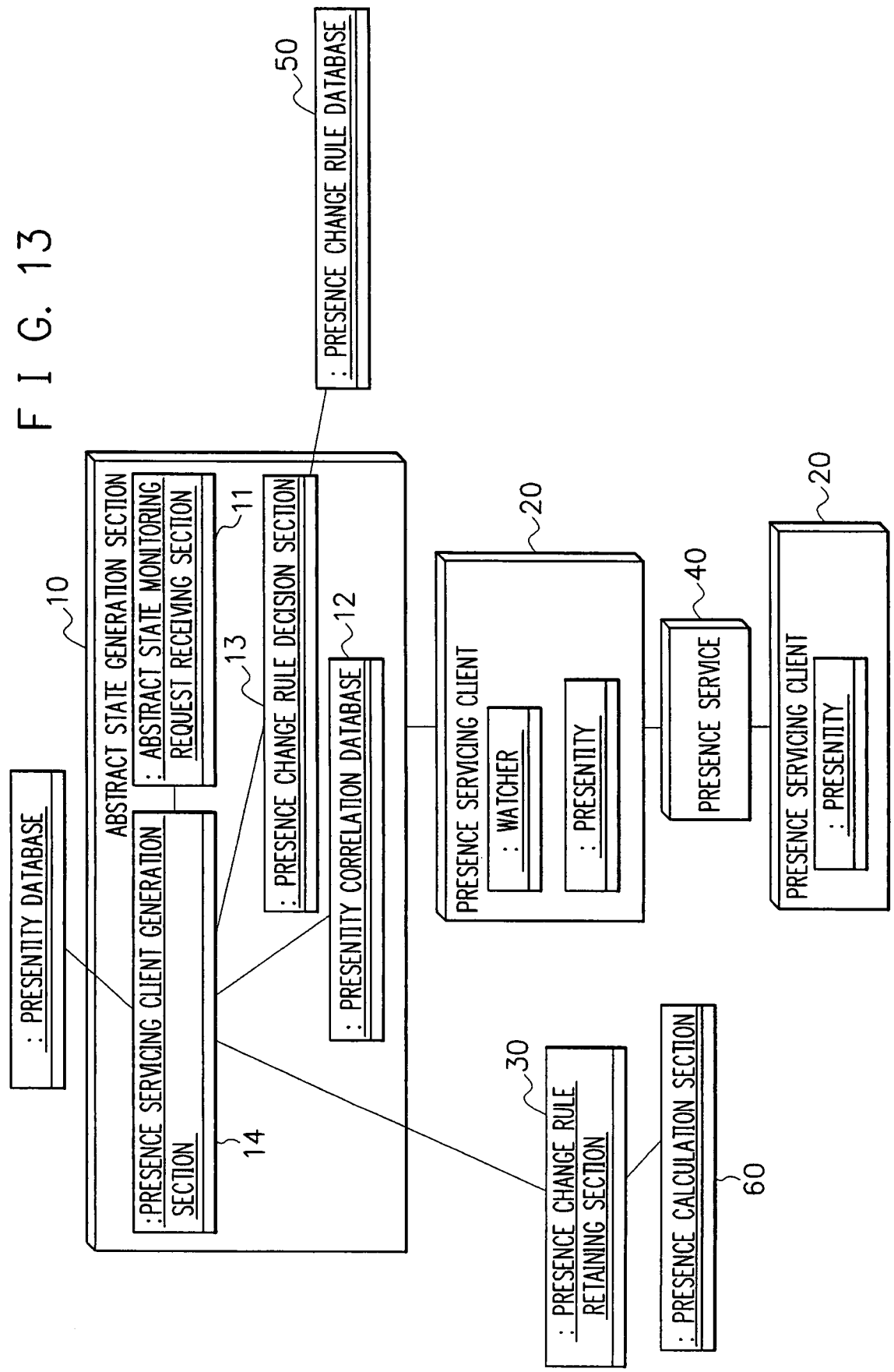
FIG. 13 shows the general configuration of an abstract state monitoring system according to a ninth embodiment.

In FIG. 13, the section 14 can access a presentity database.

The presentity database contains zero or more pairs of an abstract state monitoring request and the presentity identifier of a generated presence servicing client 20.

The section 14 updates the presentity database with the presentity identifier of the latest presence servicing client 20.

Hereinafter, operations following step S1-16 will be described.

Steps S1-1 and S1-2 are performed. From the abstract state monitoring request, the section 14 inquires of the presentity database whether there is already a presentity for issuing presence information for "user A's home", which is the user's house. It is consequently found that such a presentity already exists and an existing presence servicing client 20 will be reused (S9-1).

Now, a modified ninth embodiment 9-2 will be described. This embodiment checks whether an abstract state already exists that is generated by combining a constituent element of an abstract state corresponding to an abstract state monitoring request and an abstract state calculation method before generation of an abstract state, and if there is such an abstract state, will reuse the abstract state.

In FIG. 13, the section 14 can access the presentity database.

The presentity database contains zero or more sets of an abstract state constituent element, a presence change rule, and a presentity identifier.

The section 14 updates the latest set of an abstract state constituent element, a presence change rule, and a presentity identifier.

Hereinafter, operations following step S1-16 will be described.

Processes at steps S1-1 to S1-6 are performed.

The section 14 inquires of the presentity database a presentity identifier that is included in a set with the abstract state constituent element and the presence change rule. It is consequently found that a presentity already exists and an existing presence servicing client 20 will be reused (S9-2-1).

A tenth embodiment will be now described. This embodiment dynamically changes an abstract state monitoring request. In the present example, an abstract state monitoring requesting section changes an abstract state monitoring request in accordance with presence.

In FIG. 14, the abstract state monitoring requesting section can issue an abstract state monitoring request to the section 11. The abstract state monitoring requesting section can also access a watcher that observes a presentity via the section 40 and obtain the presence of the presentity observed by the watcher. This embodiment assumes that the watcher is observing "person A" presentity and that the presence of person A indicates position information for person A.

Following steps enable analysis of the temperature in proximity of person A.

The abstract state monitoring requesting section obtains the latest presence of person A from the watcher. The presence of person A indicates that person A is now in a warehouse S1 (S10-1).

The abstract state monitoring requesting section requests "the temperature in a warehouse S1" from the section 11 (S10-2).

The abstract state monitoring requesting section obtains the latest presence of person A from the watcher. The presence of person A indicates that person A is now in a warehouse S2 (S10-3).

The abstract state monitoring requesting section requests "the temperature in warehouse S2" from the section 11 (S10-4).

A modified tenth embodiment 10-2 will be now described. This embodiment utilizes rules for automatically changing an abstract state monitoring request (or abstract state monitoring request rules). The tenth embodiment described above may also be realized utilizing the abstract state monitoring request rules.

An abstract state monitoring request rule can be described in "IF. THEN . . . " format. In this case, the left part (IF . . . ) is a conditional expression for the presence value of another presentity watched by the watcher. Meanwhile, the right part (THEN . . . ) specifies a value to which an abstract state monitoring request should be set. For example, the tenth embodiment described above may apply such a rule as "IF the presence of presentity A indicates that its position is a warehouse S1, THEN the temperature in a warehouse S1 is requested" (hereinafter "rule RR1").

Figure 15:
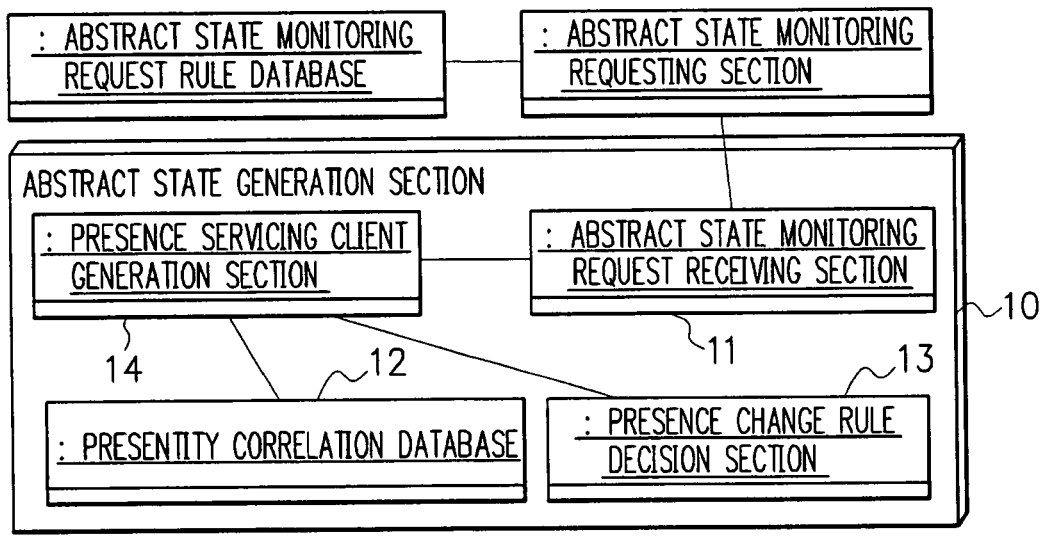
FIG. 15 shows the general configuration of an abstract state monitoring system according to an embodiment 10-2.

In FIG. 15, an abstract state monitoring request rule database contains abstract state monitoring request rules. The abstract state monitoring requesting section can retain abstract state monitoring rules.

The abstract state monitoring requesting section obtains and retains the abstract state monitoring request rule RR1 for getting the effective temperature for person A from the abstract state monitoring request rule database (S10-2-1).

The abstract state monitoring requesting section obtains the latest presence of person A from the watcher. The presence of person A indicates that person A is now in a warehouse S1 (S10-2-2).

Based on the RR1 it retains, the abstract state monitoring requesting section requests "the temperature in a warehouse S1" from the section 11 (S10-2-3).

The abstract state monitoring requesting section obtains the latest presence of person A from the watcher. The presence of person A indicates that person A is now in a warehouse S2 (S10-2-4).

Based on the RR1 it retains, the abstract state monitoring requesting section requests "the temperature in a warehouse S2" from the section 11 (S10-2-5).

According to this embodiment, an abstract state monitoring request can be changed in response to update of state of an abstract state constituent element. A conventional technique would calculate suspicious person presence information that does not correspond with an actual situation because the contents of a suspicious person monitoring request cannot be changed in accordance with the state of floor equipment. However, according to this embodiment, when floor equipment gets out of order, for example, a suspicious person monitoring request synchronizes with the state of the floor equipment and the suspicious person monitoring request can be automatically changed.

A modified tenth embodiment 10-3 will be now described. This embodiment processes an abstract state monitoring request into a concrete request.

Figure 16:
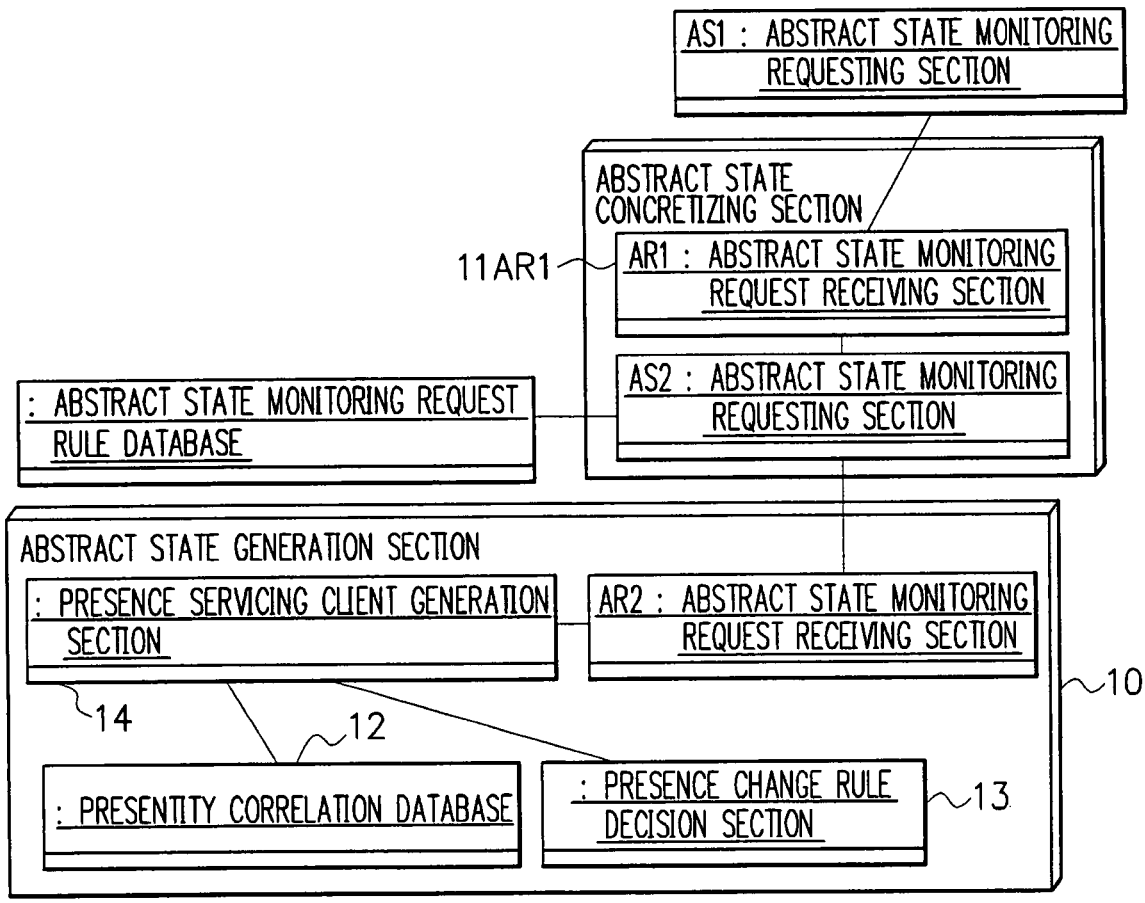
FIG. 16 shows the general configuration of an abstract state monitoring system according to an embodiment 10-3.

In FIG. 16, an abstract state concretizing section consists of an abstract state monitoring request receiving section 11AR1 and an abstract state monitoring requesting section AS2.

The section AS2 issues an abstract state monitoring request "the temperature in proximity of person A" to the section 11AR1 (S10-3-1).

The section 11AR1 passes the abstract state monitoring request to the section AS2 (S10-3-2).

Following steps are similar to step S10-1 and subsequent steps.

Figure 17:
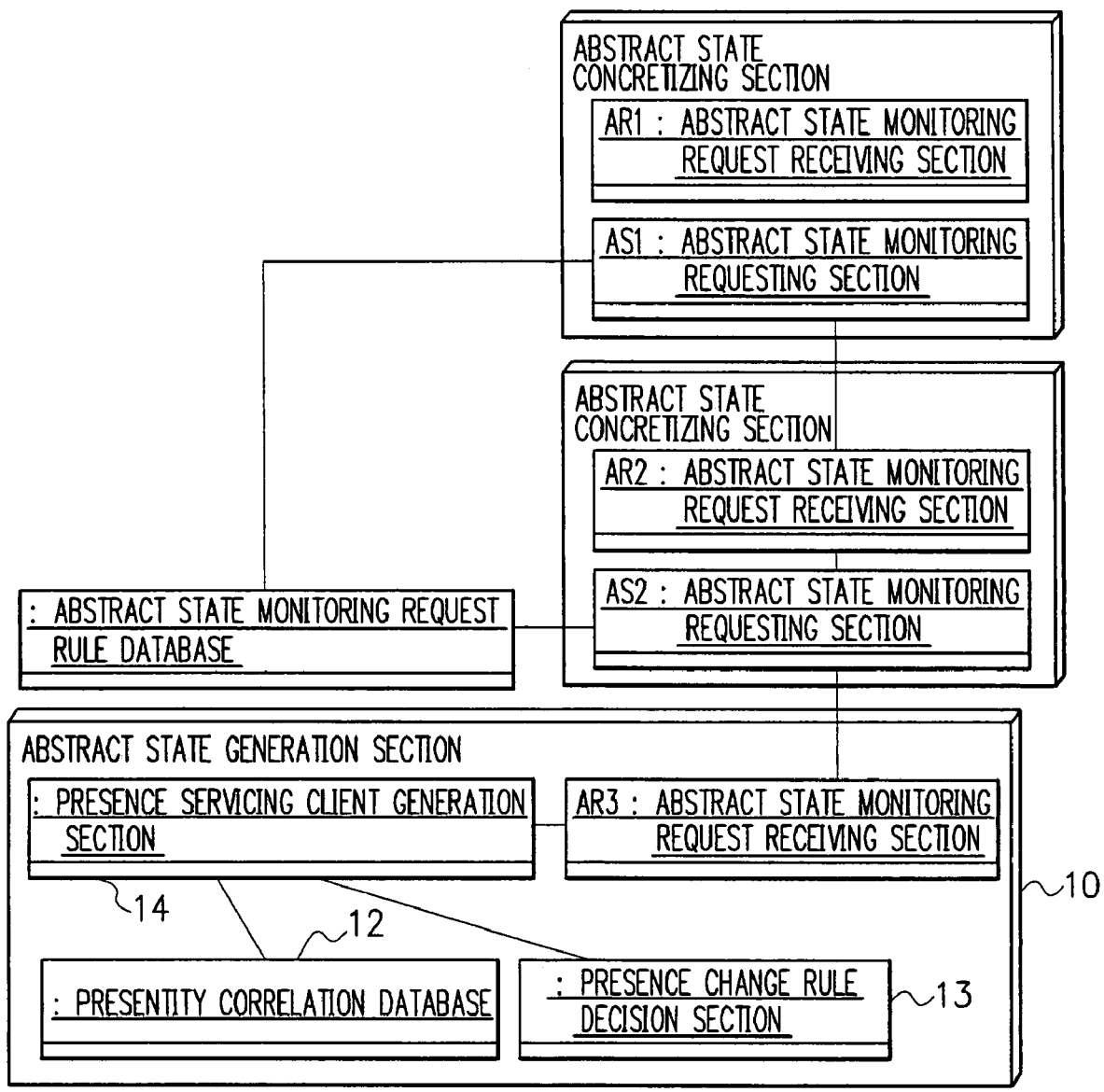
FIG. 17 shows the general configuration of an abstract state monitoring system according to an embodiment 10-3.

In addition, as illustrated in FIG. 17, the abstract state concretizing section may issue an abstract state monitoring request to another abstract state concretizing section. Further, one abstract state concretizing section may be coupled to a plurality of abstract state concretizing sections and they may be connected in a multistage manner.

Also, one or more abstract state monitoring requesting sections may be provided with respect to one abstract state monitoring request rule database.

Also, a single abstract state monitoring rule database may be utilized by a plurality of abstract state monitoring requesting sections. Further, one abstract state monitoring request rule database may be prepared for one abstract state monitoring requesting section.

The above-described embodiments are preferred embodiments of the invention and various modifications can be made thereto without departing from the scope of the invention. For example, processing for realizing the functions of the system may be performed by devices reading programs that realize the functions of the section 10, the client 20, the section 30, the section 40, the database 50, and the section 60 of the above-described embodiments. Those programs may be supplied to another computer system on a computer-readable recording medium such as a CD-ROM and a magneto-optical disk, or being transmitted on a carrier wave via a transmission medium such as the Internet or a telephone line.

While the above-described embodiments discuss a system configuration in which the section 10, the client 20, the section 30, the section 40, the database 50, and the section 60 are separately connected, the embodiments are of course applicable to a configuration that realizes those functions as one computer system and/or a configuration that adds a plurality of devices and the like to each of the functions.

What is claimed is:

1. An abstract state monitoring system, wherein
an abstract state generation section comprises abstract state monitoring requesting section, presence servicing client generation section, and presence change rule decision section;
the abstract state generation section receives an abstract state monitoring request with the abstract state monitoring requesting section and extracts a constituent element of an abstract state from the monitoring request;
the presence servicing client generation section selects a rule for calculating an abstract state from the presence of the element and generates a presence servicing client that has a watcher for observing the element via a presence service and a presentity for issuing the presence of an abstract state to the presence service;
a user monitors the abstract state via the presence service; and
the abstract state generation section obtains presence via the presence service with the presence change rule decision section and changes the rule for calculating an abstract state in accordance with the presence.

2. The abstract state monitoring system according to claim 1, wherein an abstract state monitoring request is derived from natural language.

3. The abstract state monitoring system according to claim 1, comprising a section that changes an abstract state monitoring request in accordance with presence and sending the abstract state monitoring request to the abstract state generation section.

4. The abstract state monitoring system according to claim 1, wherein a state update rule for an abstract state is selected in accordance with an abstract state monitoring request.

5. The abstract state monitoring system according to claim 1, wherein a constituent element of an abstract state is associated with a state update rule.

6. The abstract state monitoring system according to claim 1, wherein a constituent element of an abstract state is dynamically associated with a state update rule.

7. The abstract state monitoring system according to claim 1, wherein a constituent element of an abstract state is associated with a state update rule in accordance with presence.

8. The abstract state monitoring system according to claim 1, wherein a constituent element of an abstract state is associated with a state update rule in accordance with user input.

9. The abstract state monitoring system according to claim 1, wherein presentity correlation data is managed in a general correlation database and an individual correlation database separately.

10. The abstract state monitoring system according to claim 1, wherein a constituent element of an abstract state is associated with a state update rule based on a rule.

11. The abstract state monitoring system according to claim 1, wherein an abstract state is reused.

12. The abstract state monitoring system according to claim 1, wherein an abstract state monitoring request is dynamically changed.

13. The abstract state monitoring system according to claim 1, wherein an abstract state monitoring request is dynamically changed in accordance with presence.

14. The abstract state monitoring system according to claim 1, wherein an abstract state monitoring request is changed based on an abstract state monitoring request rule.

15. The abstract state monitoring system according to claim 1, wherein an abstract state monitoring request is issued from an abstract state monitoring request.

16. The abstract state monitoring system according to claim 1, wherein processes for issuing an abstract state monitoring request from an abstract state monitoring state are connected to one another in a multistage manner.

17. The abstract state monitoring system according to claim 1, wherein a single abstract state monitoring request rule database is used by a plurality of abstract state monitoring requesting sections.

18. The abstract state monitoring system according to claim 1, wherein an abstract state is generated from natural language.

19. An abstract state monitoring method, wherein
an abstract state generation section comprises abstract state monitoring requesting section, presence servicing client generation section, and presence change rule decision section;
the abstract state generation section receives an abstract state monitoring request with the abstract state monitoring requesting section and extracts a constituent element of an abstract state from the monitoring request;

the presence servicing client generation section selects a rule for calculating an abstract state from the presence of the element and generates a presence servicing client that has a watcher for observing the element via a presence service and a presentity for issuing the presence of an abstract state to the presence service;

a user monitors the abstract state via the presence service; and the abstract state generation section obtains presence via the presence service with the presence change rule decision section and changes the rule for calculating an abstract state in accordance with the presence.

20. The abstract state monitoring method according to claim 19, wherein an abstract state is generated from natural language.

21. The abstract state monitoring method according to claim 19, wherein an abstract state monitoring request is derived from natural language.

22. The abstract state monitoring method according to claim 19, comprising a section that changes an abstract state monitoring request in accordance with presence and sending the abstract state monitoring request to the abstract state generation section.

23. The abstract state monitoring method according to claim 19, wherein a state update rule for an abstract state is selected in accordance with an abstract state monitoring request.

24. The abstract state monitoring method according to claim 19, wherein a constituent element of an abstract state is associated with a state update rule.

25. The abstract state monitoring method according to claim 19, wherein a constituent element of an abstract state is dynamically associated with a state update rule.

26. The abstract state monitoring method according to claim 19, wherein a constituent element of an abstract state is associated with a state update rule in accordance with presence.

27. The abstract state monitoring method according to claim 19, wherein a constituent element of an abstract state is associated with a state update rule in accordance with user input.

28. The abstract state monitoring method according to claim 19, wherein presentity correlation data is managed in a general correlation database and an individual correlation database separately.

29. The abstract state monitoring method according to claim 19, wherein a constituent element of an abstract state is associated with a state update rule based on a rule.

30. The abstract state monitoring method according to claim 19, wherein an abstract state is reused.

31. The abstract state monitoring method according to claim 19, wherein an abstract state monitoring request is dynamically changed.

32. The abstract state monitoring method according to claim 19, wherein an abstract state monitoring request is dynamically changed in accordance with presence.

33. The abstract state monitoring method according to claim 19, wherein an abstract state monitoring request is changed based on an abstract state monitoring request rule.

34. The abstract state monitoring method according to claim 19, wherein an abstract state monitoring request is issued from an abstract state monitoring request.

35. The abstract state monitoring method according to claim 19, wherein processes for issuing an abstract state monitoring request from an abstract state monitoring state are connected to one another in a multistage manner.

36. The abstract state monitoring method according to claim 19, wherein a single abstract state monitoring request rule database is used by a plurality of abstract state monitoring requesting sections.

* * * * *